(12) United States Patent
Daw Perez et al.

(10) Patent No.: US 11,203,431 B2
(45) Date of Patent: Dec. 21, 2021

(54) SELF-CALIBRATING MULTI-SENSOR CARGO HANDLING SYSTEM AND METHOD

(71) Applicant: GOODRICH CORPORATION, Charlotte, NC (US)

(72) Inventors: Zamira A. Daw Perez, Albany, CA (US); Alessandro Pinto, Kensington, CA (US); Richa Varma, El Cerrito, CA (US); Binu M. Nair, San Mateo, CA (US); Xiaobin Zhang, Morgan Hill, CA (US)

(73) Assignee: Goodrich Corporation, Charlotte, NC (US)

( * ) Notice: Subject to any disclaimer, the term of this patent is extended or adjusted under 35 U.S.C. 154(b) by 538 days.

(21) Appl. No.: 16/166,807

(22) Filed: Oct. 22, 2018

(65) Prior Publication Data
US 2020/0122835 A1   Apr. 23, 2020

(51) Int. Cl.
| | |
|---|---|
| *B64D 9/00* | (2006.01) |
| *G06K 9/00* | (2006.01) |
| *B64C 1/20* | (2006.01) |
| *B65G 69/28* | (2006.01) |
| *G05B 19/418* | (2006.01) |
| *B64F 1/32* | (2006.01) |

(52) U.S. Cl.
CPC ............... *B64D 9/003* (2013.01); *B64C 1/20* (2013.01); *B65G 69/287* (2013.01); *G05B 19/4189* (2013.01); *B64D 2009/006* (2013.01); *B64F 1/32* (2013.01); *B65G 2203/0233* (2013.01); *B65G 2203/0283* (2013.01); *B65G 2203/042* (2013.01); *G05B 19/4182* (2013.01); *G06K 2009/00583* (2013.01)

(58) Field of Classification Search
CPC .......................... B64D 2009/006; B64D 9/003
See application file for complete search history.

(56) References Cited

U.S. PATENT DOCUMENTS

| | | | | |
|---|---|---|---|---|
| 6,871,823 | B2 * | 3/2005 | Roberts ..................... | B64C 1/20 |
| | | | | 198/370.09 |
| 8,515,656 | B2 * | 8/2013 | Reed ........................ | B64D 9/00 |
| | | | | 701/124 |
| 9,162,765 | B2 * | 10/2015 | Huber ....................... | B64C 1/22 |
| 9,340,286 | B2 * | 5/2016 | Panzram .................. | B64D 9/00 |
| 10,005,564 | B1 * | 6/2018 | Bhatia ...................... | B64C 1/22 |
| 2006/0186271 | A1 * | 8/2006 | Jacobsen .................. | B60P 1/36 |
| | | | | 244/137.1 |
| 2008/0167760 | A1 * | 7/2008 | Scherenberger ........ | G06Q 50/28 |
| | | | | 701/3 |

(Continued)

FOREIGN PATENT DOCUMENTS

WO   2018051349   3/2018

*Primary Examiner* — Thomas Randazzo
(74) *Attorney, Agent, or Firm* — Snell & Wilmer L.L.P.

(57) ABSTRACT

An autonomous cargo handling system having a sensor self-calibration system may comprise a sensing agent configured to monitor a sensing zone, and a system controller in electronic communication with the first sensing agent. The system controller may be configured to receive structural cargo deck data from the first sensing agent, generate a real-time cargo deck model, identify a cargo deck component in the real-time cargo deck model, and determine a position of the sensing agent relative to the cargo deck component.

20 Claims, 7 Drawing Sheets

(56) References Cited

U.S. PATENT DOCUMENTS

| | | | |
|---|---|---|---|
| 2009/0121085 A1* | 5/2009 | Hettwer | B64D 9/00 244/137.1 |
| 2009/0304482 A1* | 12/2009 | Sanford | B64D 9/00 414/495 |
| 2010/0213313 A1* | 8/2010 | Reed | B64D 9/00 244/118.1 |
| 2012/0101636 A1* | 4/2012 | Huber | B64D 9/00 700/275 |
| 2012/0312926 A1* | 12/2012 | Holzner | B64D 9/00 244/137.1 |
| 2012/0314030 A1* | 12/2012 | Datta | G06T 3/40 348/44 |
| 2013/0342353 A1* | 12/2013 | Choi | G06Q 10/08 340/686.1 |
| 2015/0225082 A1* | 8/2015 | Levron | B64D 9/00 244/137.1 |
| 2015/0298808 A1* | 10/2015 | Huber | B64C 1/20 701/25 |
| 2016/0061591 A1 | 3/2016 | Pangrazio et al. | |
| 2016/0117536 A1* | 4/2016 | Johnsen | G06Q 10/0833 340/3.1 |
| 2019/0322369 A1* | 10/2019 | Weisfelner | B64D 9/003 |

* cited by examiner

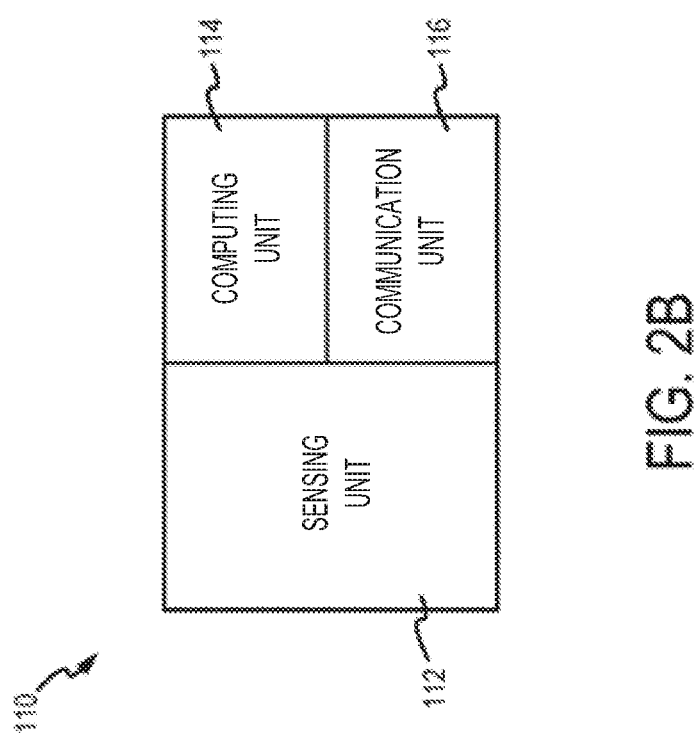

US 11,203,431 B2

SELF-CALIBRATING MULTI-SENSOR CARGO HANDLING SYSTEM AND METHOD

FIELD

The present disclosure relates to cargo handling systems, and more specifically, to a self-calibrating multi-sensor cargo handling system and method.

BACKGROUND

Cargo handling systems move loads, for example, pallets or Unit Load Devices (ULDs) through the cargo area of an aircraft using motorized wheels (e.g., Power Drive Units (PDUs)) located generally along on a cargo deck of the aircraft. An autonomous cargo handling system (ACHS) may move a ULD to a given position by sending a control signals to the PDUs. The ACHS may assess the situation within the cargo area. For example, the ACHS may determine the position of humans, ULDs, PDUs, etc. within the cargo area. The ACHS may decide how the ULD should move based on the assessed situation, and then send the corresponding control signals to the PDUs. Errors in the situation assessment can produce a wrong decision, which reduces system performance and can lead to catastrophic accidents (e.g., not detecting possible collisions). Errors in the situation assessment may be caused by inaccuracy in the positioning and orientation of sensors of the ACHS. Positioning and orientating the ACHS sensors with the accuracy associated with high ACHS performance accuracy tends to increase the costs of ACHS installation. Furthermore, the position and orientation of the sensors can change after installation due human intervention (e.g., human hits the sensor), mechanical factors (e.g., varying fuel amount), cargo loads (e.g., larger ULDs may bend or otherwise affect the cargo deck geometry) and/or naturally over time.

SUMMARY

An autonomous cargo handling system capable of sensor self-calibration is provided herein. In accordance with various embodiments, the system may comprise a first sensing agent configured to monitor a first sensing zone, and a system controller in electronic communication with the first sensing agent. A tangible, non-transitory memory is configured to communicate with the system controller. The tangible, non-transitory memory may have instructions stored thereon that, in response to execution by the system controller, cause the system controller to perform operations which may comprise: receiving, by the system controller, structural cargo deck data from the first sensing agent; generating, by the system controller, a real-time cargo deck model based on the structural cargo deck data; identifying, by the system controller, a cargo deck component in the real-time cargo deck model; and determining, by the system controller, a position of the first sensing agent relative to the cargo deck component.

In various embodiments, the first sensing agent may comprise at least one of a camera, a structured light sensor, a light detection and ranging (LiDAR) sensor, an infrared sensor, a depth sensor, a 3D scanner, an ultrasound range finder, or a radar sensor.

In various embodiments, determining the position of the first sensing agent may comprise determining where relative to a boundary of the first sensing zone the cargo deck component is detected. In various embodiments, the system controller may be configured to determine the position of the first sensing agent relative to the cargo deck component each time a new loading event is initiated.

In various embodiments, the system controller may be configured to determine the position of the first sensing agent relative to the cargo deck component at a defined time interval throughout a loading event.

In various embodiments, identifying the cargo deck component in the real-time cargo deck model may comprise comparing, by the system controller, the real-time cargo deck model to a stored cargo deck model. In various embodiments, the stored cargo deck model may be a computer aided design model.

In various embodiments, a second sensing agent may be configured to monitor a second sensing zone. The operations performed by the system controller may further comprise determining, by the system controller, a position of the second sensing agent relative to the cargo deck component; and determining, by the system controller, a position of the first sensing zone relative to the second sensing zone.

A method is also disclosed herein. In accordance with various embodiments, the method may comprise the steps of receiving, by a system controller, structural cargo deck data from a sensing agent; identifying, by the system controller, a cargo deck component; and determining, by the system controller, a position of the sensing agent relative to the cargo deck component.

In various embodiments, the step of identifying the cargo deck component may comprise determining, by the system controller, a cargo deck component property based on the structural cargo deck data; and comparing, by the system controller, the cargo deck component property to a stored cargo deck model comprising data corresponding to properties of known cargo deck components. In various embodiments, the cargo deck component property may comprise at least one of an image of the cargo deck component, a video of the cargo deck component, a dimension of the cargo deck component, a shape of the cargo deck component, a characteristic of the cargo deck component, an orientation of the cargo deck component, a location of the cargo deck component, or point cloud data.

In various embodiments, the step of identifying the cargo deck component may comprise generating, by the system controller, a real-time cargo deck model using the structural cargo deck data; and comparing the real-time cargo deck model to a stored cargo deck model.

In various embodiments, the method may further comprise the steps of identifying, by the system controller, if a calibration error condition exists; and ordering, by the system controller, a fault alert if the calibration fault condition exists. In various embodiments, the step of identifying if the calibration fault condition exists may comprise comparing, by the system controller, the position of the sensing agent relative to the cargo deck component to a predetermined position range.

In various embodiments, the sensing agent may comprise at least one of a camera, a structured light sensor, a light detection and ranging (LiDAR) sensor, an infrared sensor, a depth sensor, a 3D scanner, an ultrasound range finder, or a radar sensor.

An aircraft is also disclosed herein. In accordance with various embodiments, the aircraft may comprise a cargo deck defined by an aircraft envelope; a sensing agent coupled to the aircraft envelope. The sensing agent may be configured to monitor a sensing zone defining a logical boundary within the cargo deck. A system controller may be in electronic communication with the sensing agent. A tangible, non-transitory memory may be configured to communicate with the system controller. The tangible, non-transitory memory may have instructions stored thereon that, in response to execution by the system controller, cause the system controller to perform operations that may comprise: receiving, by a system controller, structural cargo deck data from the sensing agent; identifying, by the system controller, a cargo deck component; and determining, by the system controller, a position of the sensing agent relative to the cargo deck component.

In various embodiments, identifying the cargo deck component may comprise determining, by the system controller, a cargo deck component property based on the structural cargo deck data; and comparing, by the system controller, the cargo deck component property to a stored cargo deck model comprising data corresponding to properties of known cargo deck components. In various embodiments, the cargo deck component property may comprise at least one of an image of the cargo deck component, a video of the cargo deck component, a dimension of the cargo deck component, a shape of the cargo deck component, a characteristic of the cargo deck component, an orientation of the cargo deck component, a location of the cargo deck component, or point cloud data.

In various embodiments, the sensing agent may comprise at least one of a camera, a structured light sensor, a light detection and ranging (LiDAR) sensor, an infrared sensor, a depth sensor, a 3D scanner, an ultrasound range finder, a radar sensor.

In various embodiments, identifying the cargo deck component may comprise: generating, by the system controller, a real-time cargo deck model using the structural cargo deck data; and comparing the real-time cargo deck model to a stored cargo deck model.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like numbers denote to like elements.

FIG. 2B illustrates a block diagram of an exemplary sensing agent, in accordance with various embodiments;

Figure 1A:
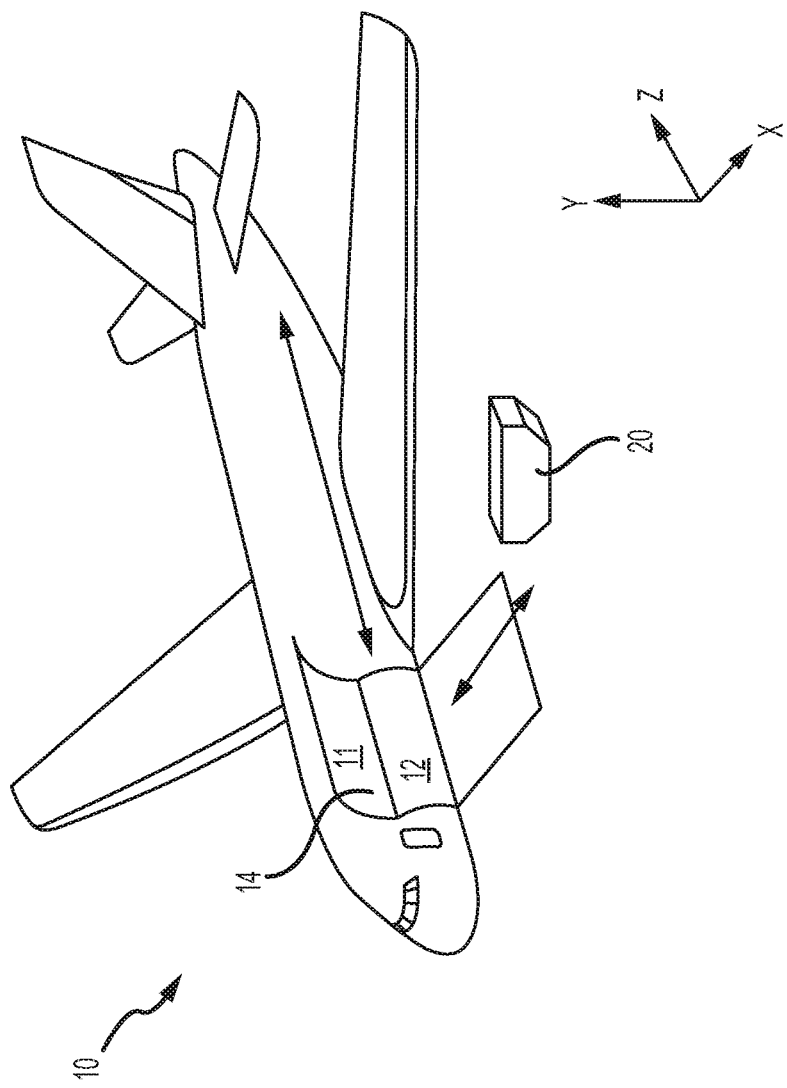
FIG. 1A illustrates a schematic view of an aircraft being loaded with cargo, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity. An X-Y-Z axis has been provided in various figures for ease of illustration.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

Autonomous cargo handling systems (ACHSs), as disclosed herein, may be used to load, move, and unload cargo. The present disclosure describes ACHSs and methods for sensor self-calibration. In various embodiments, a system controller of the ACHS may be configured to determine a position of the sensors of the ACHS. As used herein, "a position of a sensor" refers to the sensor's location along the X, Y, and Z axes and the sensor's orientation (i.e., angle) relative to the X, Y, and Z axes. The disclosed sensor self-calibration can be realized in an empty cargo area and in a fully loaded cargo area. In accordance with various embodiments, during the sensor self-calibration, the system controller may identify known structural elements of the cargo handling system and of the cargo deck within each sensor's field of view, and based on the known elements determine a position of each sensor. Sensor self-calibration, as described herein, may reduce costs associated with sensor installation and/or sensor replacement, as the sensor self-calibration accommodates inaccuracy in initial sensor installation as well as movement of the sensors that may be caused by human intervention and/or by mechanical and climate factors. The disclosed ACHS having self-calibrating sensors may be used in aircraft cargo management systems. However, the systems and methods of the present disclosure may also be suitable for use in non-aircraft cargo handling systems.

In accordance various embodiments, and with reference to FIG. 1, an aircraft 10 having a cargo deck 12 is illustrated.

Aircraft 10 may comprise a cargo load door 14. Cargo 20 may be loaded through cargo load door 14 and onto cargo deck 12. Items to be shipped by air, freight, and/or the like are typically loaded first onto specially configured pallets or into specially configured containers. In aviation, those various pallets and/or containers are commonly are referred to as unit load devices (ULDs). In various embodiments, cargo 20 may be a ULD. ULDs are available in various sizes and capacities, and are typically standardized in dimension and shape. Once loaded with items, ULDs may be loaded onto aircraft 10 through cargo load door 14 and onto cargo deck 12 using a conveyor ramp, scissor lift, or the like. Once inside aircraft 10, the ULD is moved along cargo deck 12 to its final stowage position. Multiple ULDs may be brought on-board aircraft 10, during one or more loading procedures (e.g., at separate destinations), with each ULD being placed in its respective stowage and transportation position on cargo deck 12. After aircraft 10 has reached its destination, one or more of the ULDs may be unloaded from aircraft 10 similarly, but in reverse sequence to the loading procedure.

Figure 1B:
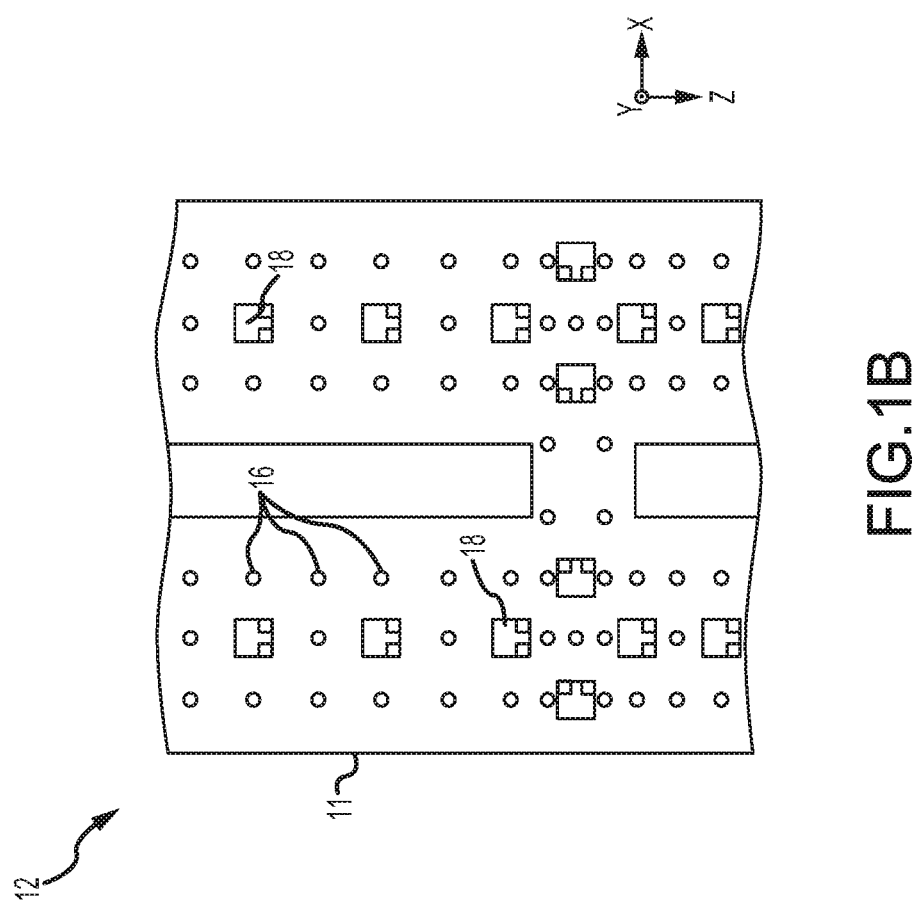
FIG. 1B illustrates a portion of an aircraft cargo deck, in accordance with various embodiments.

In accordance with various embodiments, and with reference to FIG. 1B, cargo deck 12 is illustrated in greater detail. The cargo deck 12 may be defined by an inner wall of aircraft 10 (e.g., an aircraft envelope 11). Cargo deck 12 may include a plurality of freely rotating conveyance rollers 16 and a number of power drive units (PDUs) 18 mounted in cargo deck 12. PDUs 18 may be configured propel ULDs cargo over conveyance rollers 16 and across cargo deck 12.

Figure 2A:
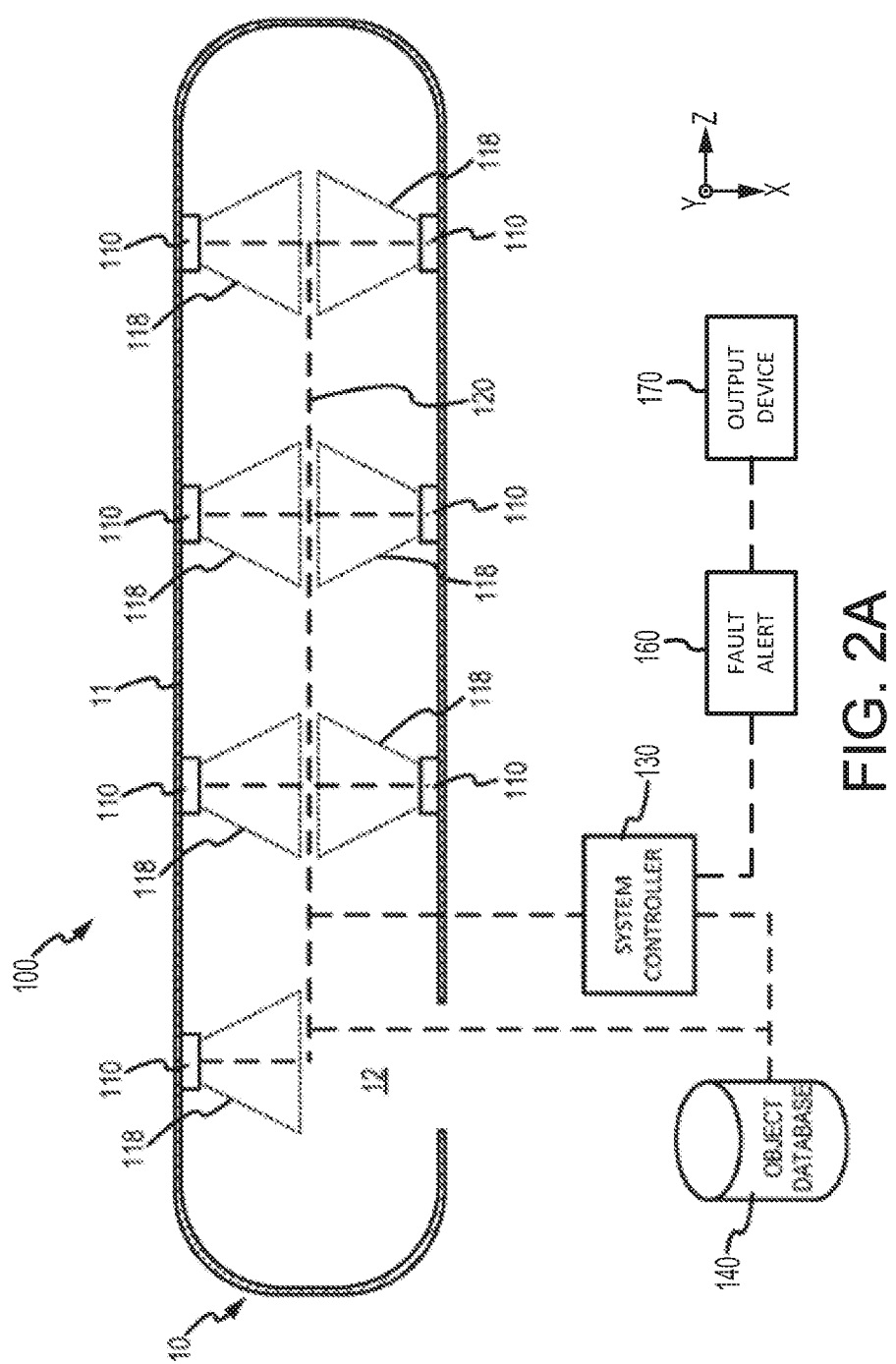
FIG. 2A illustrates a top view of an autonomous cargo handling system with sensors self-calibration, in accordance with various embodiments.

Referring to FIG. 2A, to facilitate movement of ULDs along cargo deck 12, aircraft 10 may include an autonomous cargo handling system 100. Autonomous cargo handling system 100 may be configured to monitor and gather data during the cargo loading and unloading processes. For example, in various embodiments, autonomous cargo handling system 100 may, among other things, monitor and gather data to control the movement of ULDs, to detect non-ULDs (e.g., human operators, etc.) in cargo deck 12, and to assess and detect possible collisions of ULDs with aircraft envelope 11, with other ULDs, and/or with humans or other object on cargo deck 12.

Autonomous cargo handling system 100 may comprise one or more sensing agents 110 (e.g., a first sensing agent, a second sensing agent, an Nth sensing agent, etc.). Each sensing agent 110 may be configured to monitor and gather data during the cargo loading process. Sensing agents 110 may be located in any suitable location for monitoring the cargo loading process. In various embodiments, sensing agents 110 may be coupled to an inner surface of aircraft envelope 11, a cargo deck ceiling, a cargo deck floor, or any other suitable location within the cargo area. Sensing agents 110 may be located at any suitable location on aircraft envelope 11 along the Y axis, such as, for example, at a midpoint between the cargo desk ceiling and the cargo deck floor. Sensing agents 110 may be stationary or may be configured to rotate and/or move along the X, Y, and/or Z axis. Sensing agents 110 may be dispersed throughout cargo deck 12 to at least partially ensure monitoring coverage throughout cargo deck 12, (e.g., to create a distributed network of sensing agents 110).

Each sensing agent 110 may comprise any suitable apparatus capable of monitoring and gathering data during the cargo loading process. Each sensing agent 110 may also be computer based, and may comprise a processor, a tangible non-transitory computer-readable memory, and/or a network interface, along with other suitable system software and hardware components. Instructions stored on the tangible non-transitory memory may allow each sensing agent 110 to perform various functions, as described herein.

System program instructions and/or processor instructions may be loaded onto a tangible, non-transitory, computer-readable medium (also referred to herein as a tangible, non-transitory, memory) having instructions stored thereon that, in response to execution by a system controller 130, cause the processor to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

In various embodiments, each sensing agent 110 may also comprise various sub-components to aid in monitoring and gathering data in cargo deck 12. For example, and with reference to FIG. 2B, each sensing agent 110 may comprise a sensing unit 112, a computing unit 114, and/or a communication unit 116. Sensing unit 112, computing unit 114, and/or communication unit 116 may be in operative and/or electronic communication with each other and with system controller 130. Computing unit 114 may include logic configured to control sensing unit 112 and/or communication unit 116. In various embodiments, each sensing agent 110 may also comprise any other suitable and/or desirable sub-component, such as, for example an actuation component configured to provide an actuating force to one or more PDUs 18 (FIG. 1B) in cargo deck 12. In that respect, computing unit 114 may variably control the PDUs 18 via communication unit 116 or via direct control of the actuation component.

In various embodiments, each sensing agent 110 may comprise one or more sensing units 112. Sensing unit 112 may comprise any suitable apparatus, hardware, and/or software capable of monitoring a portion of cargo deck 12. For example, sensing unit 112 may comprise at least one of a camera, a structured light sensor, a light detection and ranging (LiDAR) sensor, an infrared sensor, a depth sensor (e.g., a MICROSOFT® KINECT®, an ASUS® XTION PRO®, etc.), a 3D scanner, an ultrasound range finder, a radar sensor, and/or any other suitable sensing device.

In various embodiments, computing unit 114 may comprise any suitable computing device capable of controlling sensing agent 110. For example, computing unit 114 may include a processor and a tangible, non-transitory memory. Computing unit 114 may comprise one or more logic modules that implement logic to control sensing unit 112 and/or communication unit 116. Computing unit 114 may include a general purpose processor, a digital signal processor (DSP), an application specific integrated circuit (ASIC), a field programmable gate array (FPGA) or other programmable logic device, discrete gate or transistor logic, a graphics processing unit (GPU), discrete hardware components, or any combination thereof. In various embodiments, use of a computing unit 114 in each individual sensing agent 110 may allow each sensing agent 110 to perform processing operations locally (e.g., decentralized), thus at least partially reducing the bandwidth requirements relative to a central processing system (e.g., transmitting high bandwidth data, such as a video feed, to a central processing location).

In various embodiments, communication unit 116 may comprise any suitable communications interface. Communication unit 116 may allow data to be transferred between sensing agents 110. Examples of communication units 116 may include a modem, a network interface (such as an Ethernet card), a communications port, a Personal Computer Memory Card International Association (PCMCIA) slot and card, etc. Data transferred via communication unit 116 may be in the form of signals which may be electronic, electromagnetic, optical, or other signals capable of being transmitted and received by corresponding communication units 116. In various embodiments, and with combined reference to FIGS. 2A and 2B, signals are provided to and from communication unit 116 via a communications path, for example, via a network 120. Network 120 may carry signals and may be implemented using wire, cable, fiber optics, a telephone line, a cellular link, a radio frequency (RF) link, wireless, and/or other communications channels. In that regard, network 120 may interconnect each sensing agent 110, via each corresponding communication unit 116.

With continued reference to FIG. 2A, each sensing agent 110 may be configured to monitor a sensing zone 118 defined as a logical area in cargo deck 12 that each sensing agent 110 is configured to monitor. For example, each sensing zone 118 may comprise any suitable distance, such as, for example about 1.0 feet (0.305 meters) to about 5.0 feet (1.52 meters), about 5.0 feet (1.52 meters) to about 10.0 feet (3.05 meters), about 10.0 feet (3.04 meters) to about 15 feet (4.57 meters), and/or any other suitable sensing area with respect to a tolerance that may be location dependent (wherein about as used in this context refers only to +/−0.5 feet (0.15 meters)). Each sensing zone 118 may define a distinct logical area of cargo deck 12. In various embodiments, each sensing zone 118 may also at least partially overlap with a nearby sensing zone 118 to ensure sensing coverage and/or to create redundancy in monitored areas of cargo deck 12.

In accordance with various embodiments, autonomous cargo handling system 100 may be capable of sensor self-calibration. In this regard, and as discussed in further detail below, each sensing agent 110 may be configured to perform a self-calibration task to determine its position relative to stationary structures of cargo deck 12. In various embodiments, sensing agents 110 may perform the self-calibration task in response to receiving a calibration command from system controller 130 of autonomous cargo handling system 100.

System controller 130 may be in operative and/or electronic communication with each sensing agent 110 via network 120. System controller 130 may be configured to receive signals from and send control signals (or "commands") to the sensing agents 110. System controller 130 may include a general purpose processor, a DSP, an ASIC, a FPGA or other programmable logic device, discrete gate or transistor logic, discrete hardware components, or any combination thereof. System controller 130 may include a processor and a tangible, non-transitory memory. System controller 130 may also be in operative and/or electronic communication with an object database 140. In various embodiments, each sensing agent 110 may also be in direct operative and/or electronic communication with object database 140, such that each sensing agent 110 may interact with object database 140 without first interfacing with system controller 130. In various embodiments, system controller 130 may also be in operative communication with PDUs 18 (with brief reference to FIG. 1B) on cargo deck 12. In that respect, system controller 130 may be configured to control PDUs 18 based on data received from sensing agents 110.

Object database 140 may comprise any suitable data structure, such as a database (including a relational, hierarchical, graphical, blockchain, or object-oriented structure and/or any other database configurations), a flat file structure, and/or the like. Object database 140 may be configured to store and maintain data relating to autonomous cargo handling system 100. Object database 140 may store and maintain stored cargo deck models comprising data corresponding to properties of known components in cargo deck 12. For example, object database 140 may store and maintain data corresponding to the dimensions and locations of latches on the floor of cargo deck 12, the location, length, and/or angle of rails along cargo deck 12, the distances between cargo deck rails, latches, and/or other cargo deck components, etc. Object database 140 may also store cargo deck models generated using output from sensing agents 110. In accordance with various embodiments, object database 140 may also store any other suitable data related to autonomous cargo handling system 100, such as, for example, a position of each sensing agent 110, PDU models, a location of each ULD in the cargo area, a location of each non-ULD in the cargo area, object properties relating to ULDs and which may be used by sensing agents 110 to identify objects as ULDs or as non-ULDs, and/or any other suitable data corresponding to autonomous cargo handling system 100 and/or to the cargo area.

In various embodiments, in response to receiving a calibration command from system controller 130, each sensing agent 110 may output structural cargo deck data to system controller 130. For example, each sensing agent 110 may output data corresponding to the structures within the sensing agent's sensing zone 118. In various embodiments, system controller 130 may generate a real-time cargo deck model using the structural cargo deck data output from each sensing agent 110. The real-time cargo deck model may comprise a geometric representation of the portion of cargo deck 12 (e.g., a 2D object model, a 3D object model, etc.) within the sensing zone 118 of the sensing agent 110.

Figure 3:
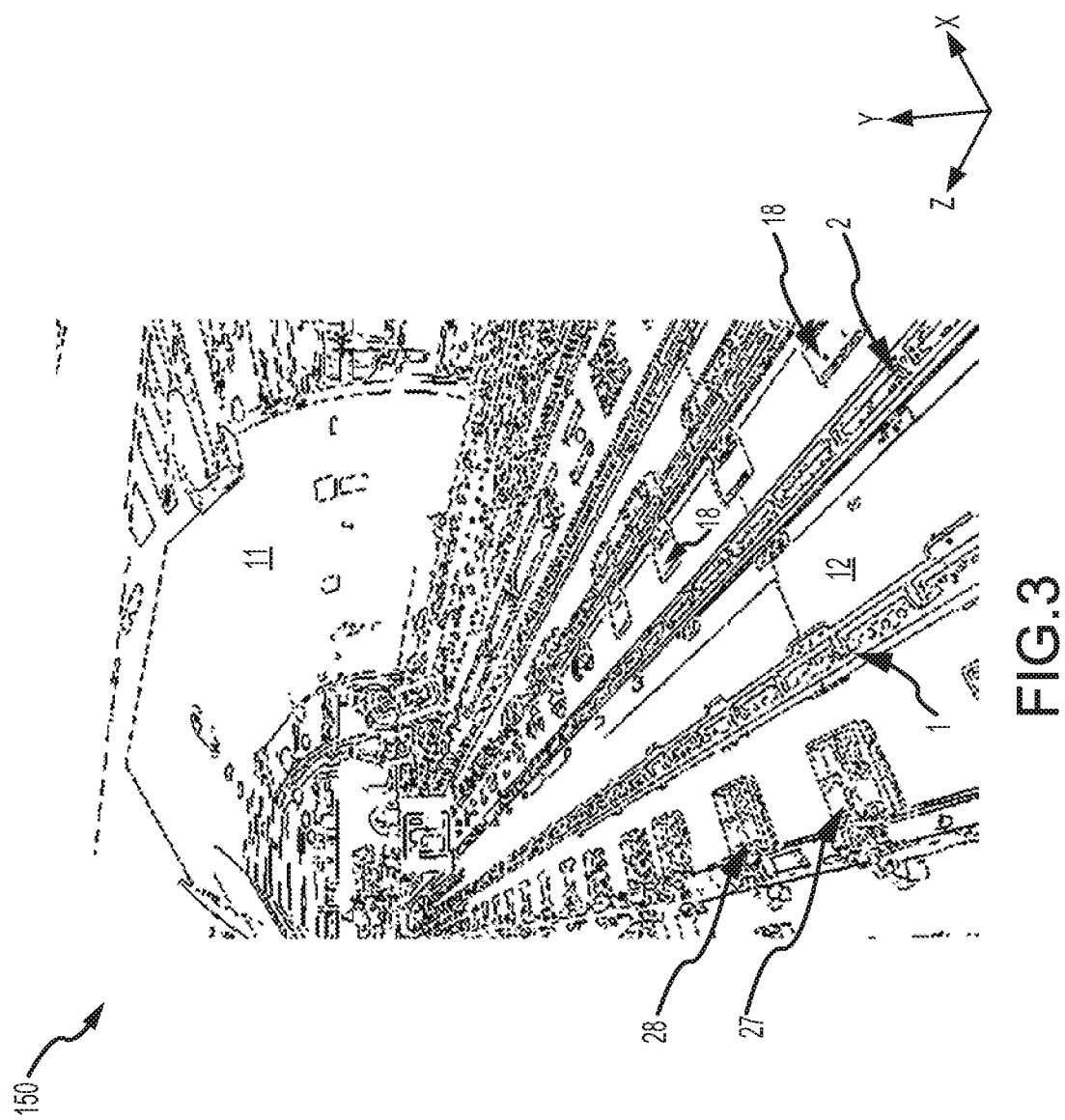
FIG. 3 illustrates a sensor generated real-time cargo deck model, in accordance with various embodiments.

FIG. 3 illustrates an exemplary real-time cargo deck model 150 generated from data output from a sensing agent 110 and illustrating the cargo deck components in the sensing zone 118 of the sensing agent 110. With combined reference to FIG. 2A and FIG. 3, system controller 130 is configured to identify cargo deck components in real-time cargo deck model 150. In various embodiments, system controller 130 may identify the cargo deck components in real-time cargo deck model 150 by comparing real-time cargo deck model 150 against a stored cargo deck model. For example, system controller 130 may analyze real-time cargo deck model 150 and query object database 140 to compare real-time cargo deck model 150 against stored cargo deck models. System controller 130 may do this for the sensing zone 118 of each sensing agent 110.

System controller 130 may use logic to identify various cargo deck components in real-time cargo deck model 150. System controller 130 may be configured to recognize and determine properties of various cargo deck components in the real-time cargo deck model 150. System controller 130 may use one or more of the recognized cargo deck component properties in real-time cargo deck model 150 to identify various cargo deck components in real-time cargo deck model 150. Cargo deck component properties may comprise one or more data points related to a cargo deck component, such as, an image of the cargo deck component, a video of the cargo deck component, a dimension (e.g., length, width, height, etc.) of the cargo deck component, a shape of the cargo deck component, a characteristic (e.g., edges, corners, textures, etc.) of the cargo deck component, an orientation of the cargo deck component, point cloud data, and/or the like. In various embodiments, the cargo deck component may be identified based on scanning physical properties of the cargo deck component. As a further example, the point cloud data may comprise a set of data points in a three-dimensional coordinate system representing the external surfaces of the cargo deck cargo deck component. In that regard, system controller 130 may generate the point cloud data to further aid in determining cargo deck component properties (e.g., dimensions, shape, characteristics, orientation, and/or similar characteristics of the cargo deck component).

As a further example, system controller 130 may implement perception logic to determine a location of an identified cargo deck component or cargo deck component properties relative to other identified cargo deck components or cargo deck component properties. For example, in various embodiments, system controller 130 may identify a latch in real-time cargo model 150 and may then determine which particular latch it is based on other identified cargo deck components or component properties. In various embodiments, system controller 130 may be preloaded with a stored cargo model comprising data indicating the dimensions and physical characteristics of the components of cargo deck 12. For example, system controller 130 may be preloaded with data indicating the dimensions and physical characteristics of various latches, rails, PDUs, and/or other structures on the floor of cargo deck 12. In various embodiments, the stored cargo deck model may comprise a computer aided design model. System controller 130 may use the stored cargo deck model together with perception logic and one or more cargo deck component properties to identify one or more cargo deck components (e.g., latch 27, latch 28, rail 1, rail 2, a PDU 18, etc.) in real-time cargo deck model 150. The stored cargo deck model (e.g., the computer aided design model) may provide system controller 130 with a positioning, as measured on the X, Y, and Z axes, of the components (e.g., latch 27, latch 28, rail 1, rail 2, PDUs 18, etc.) on cargo deck 12.

After identifying the cargo deck component, system controller 130 may then determine a position each sensing agent 110 relative the identified the cargo deck component. For example, system controller 130 may determine a distance (as measured on the X, Y, and Z axes) of each sensing agent 110 from to the identified cargo deck component and/or an orientation (i.e., an angle measured along the X, Y, and Z axes) of each sensing agent 110 relative to the identified cargo deck component. Stated differently, system controller 130 may determine a position of each sensing agent 110 based on where the identified the cargo deck component appears within the sensing zone 118 of the sensing agent 110. Stated yet another way, system controller 130 may determine a position of each sensing agent 110 based on where the identified the cargo deck component is located relative to one or more X, Y, Z axes boundaries of sensing zone 118. System controller 130 may determine the area of cargo deck 12 covered by each sensing zone 118/sensing agent 110 based on the determined position of each sensing agent 110. System controller 130 may determine the location of each sensing zone 118 relative to the other sensing zones 118 using the determined positions of each sensing agent 110. For example, in various embodiments, system controller 130 may identify the position of a first sensing agent 110 relative to a first cargo deck component (e.g., a latch on the cargo deck floor), system controller 130 may also identify the position of a second first sensing agent 110 relative to a second cargo deck component (e.g., a rail or different latch on the cargo deck floor). System controller 130 may then determine the position of the first sensing agent relative to the second agent based on the system controller's knowledge of where the first cargo deck component is located relative to the second cargo deck component. For example, the system controller may access a stored cargo deck model or other stored cargo deck data to determine the position of the first cargo deck component relative to the second cargo deck component.

In various embodiments, computing units 114 and/or communication unit 116 may be configured to process and communicate information based on the determined position of each sensing agent 110. For example, a first computing unit 114 of a first sensing agent 110 may be able to determine where a ULD is relative to the first sensing agent 110 based on a signal received from a second sensing agent 110 and using the position data for the first and second sensing agents. Knowing the position of each sensing agent 110 allows computing units 114 and system controller 130 to more accurately assess the situation on cargo deck 12, which tends to reduce errors in the situation assessment and wrong decisions produced therefrom.

Autonomous cargo handling system 100 may be configured such that sensing agents 110 will perform the self-calibration task each time autonomous cargo handling system 100 is turned on. Stated differently, system controller 130 may be configured to determine a position of each sensing agent 110 at the start of any new loading or unloading event. Stated yet another way, system controller 130 may be configured to send a calibration command to sensing agents 110 and then determine the position of each sensing agent 110 each time autonomous cargo handling system 100 is powered on. In various embodiments, system controller 130 may be configured to determine the position of sensing agents 110 continuously during operation of autonomous cargo handling system 100. In various embodiments, system controller 130 may be configured to determine the position of sensing agents 110 at a defined time interval (e.g., every minute, every 10 minutes, etc.), and/or the like. For example, system controller 130 may be configured to send a calibration command to sensing agents 110 and determine the position of each sensing agent 110 at the defined time interval.

In various embodiments, an initial calibration of sensing agents 110 is performed, upon installation of autonomous cargo handling system 100 in cargo deck 12. The initial calibration is generally performed with an empty cargo area (e.g., a cargo area having no ULDs or persons located therein). During the initial calibration, system controller 130 may identify multiple features of cargo deck 12 in the real-time cargo deck model, as the field of view of sensing agents 110 is generally unobstructed. In other words, cargo deck components, which may be covered by a ULD during operation, are generally detectable by sensing agents 110 and identifiable to system controller 130 during the initial calibration. Increasing the number of cargo deck components identified by system controller 130 tends to increase the accuracy of the sensing agent position determination and the overall accuracy in situation assessments of autonomous cargo handling system 100.

In various embodiment, a delta calibration may be performed any time after the initial calibration. During the delta calibration, system controller 130 may determine the position of each sensing agent 110 based on a perceived change in location a cargo deck component that was identified during the initial calibration. For example, during a delta calibration, system controller 130 may identify latch 27

(FIG. 3) in a real-time cargo model produced from the structural cargo deck data output from a first sensing agent 110 during the delta calibration. System controller 130 may compare the location of latch 27 in the delta calibration real-time cargo model with the location of latch 27 in an initial calibration real-time cargo model produced from the structural cargo deck data output from the first sensing agent 110 during the initial calibration. If system controller 130 determines that the location of latch 27 in the delta calibration real-time cargo model (i.e., the location of latch 27 within the sensing zone 118 of the first sensing agent 110) has changed, for example has moved by 0.3 inches (0.76 cm), relative to the location of latch 27 in the initial calibration real-time model, system controller 130 will determine a new position of the first sensing agent 110 based on the perceived change in latch 27 location. Delta calibration does not require an empty cargo area. For example, system controller 130 may be configured to identify one or more cargo deck components that are generally located beyond the area of cargo deck 12 that is covered by ULDs or other equipment during loading and unloading. In this regard, the delta calibration may be performed during the loading and/or unloading process and/or with a full, partially filled, or empty cargo deck 12.

In various embodiments, system controller 130 may be configured to recognize an error or other fault in a sensor calibration. For example, if during a delta calibration, system controller 130 cannot identify any cargo deck components in the data output from a sensing agent 110 (e.g., due to a dirty sensing unit camera) or if system controller 130 determines the position of the sensing agent 110, relative to an identified cargo deck component, is outside a predetermined position range, system controller 130 may determine a fault condition exists.

System controller 130 may be configured to warn a user that an initial calibration (i.e., a calibration with a cargo deck 12 free of ULDs and any other non-cargo deck 12 components) is needed, in response to determining a calibration fault condition exists. For example, upon recognition of a calibration fault condition, system controller 130 may order a fault alert 160 to be output by an output device 170. In various embodiments, output device 170 may be a health monitoring system of autonomous cargo handling system 100 or other system configured to communicate information to an operator of autonomous cargo handling system 100 and/or to maintenance personnel working on autonomous cargo handling system 100. For example, in various embodiments, output device 170 includes a display, a speaker, a network access device, and/or the like that sends a message to a remote terminal, or the like. System controller 130 may control output device 170 to output the health status of autonomous cargo handling system 100 to an operator of autonomous cargo handling system 100 or in the form of an alert to mechanics servicing autonomous cargo handling system 100 from a centralized system. Fault alert 160 may be displayed as a symptom code included in an autonomous cargo handling system health report, which may be reviewed during a pre-loading or unloading check and/or during a routine maintenance inspection. In various embodiments, fault alert 160 may be displayed on output device 170 to indicate immediate maintenance (e.g., an initial calibration) is needed.

Figure 4A:
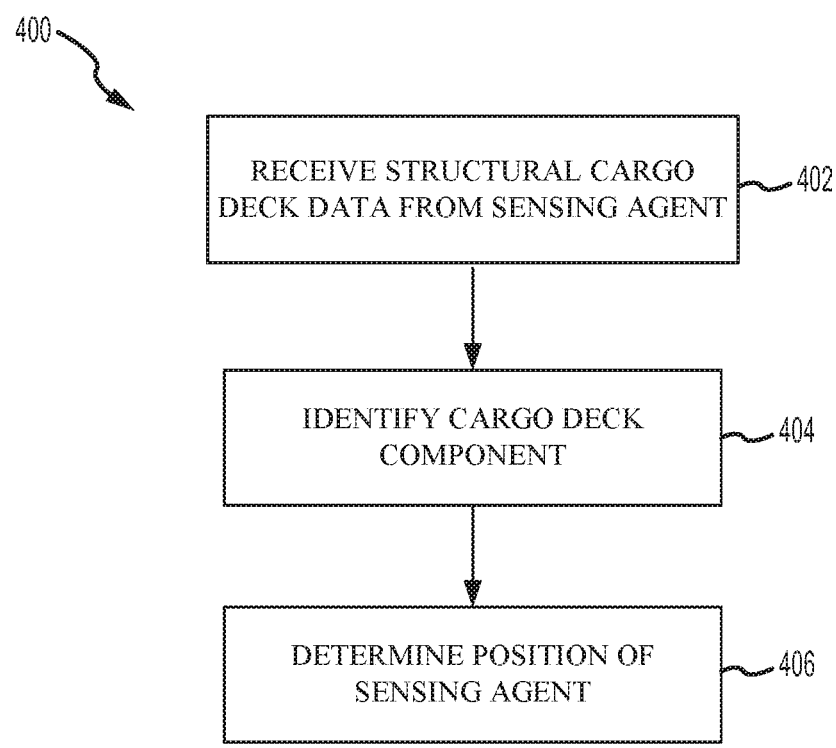
FIGS. 4A and 4B illustrate a method for sensor self-calibration, in accordance with various embodiments.

In various embodiments, and with reference to FIG. 4A and FIG. 2A, a method 400 of sensor self-calibration is disclosed. Method 400 may comprise receiving, by system controller 130, structural cargo deck data from a first sensing agent 110 (step 402), identifying, by system controller 130, a cargo deck component (step 404). For example system controller 130 may identify the cargo deck component as a particular latch, rail, etc. on cargo deck 12. Method 400 further comprises determining, by system controller 130, a position of the first sensing agent 110 relative to the cargo deck component (step 406).

Figure 4B:
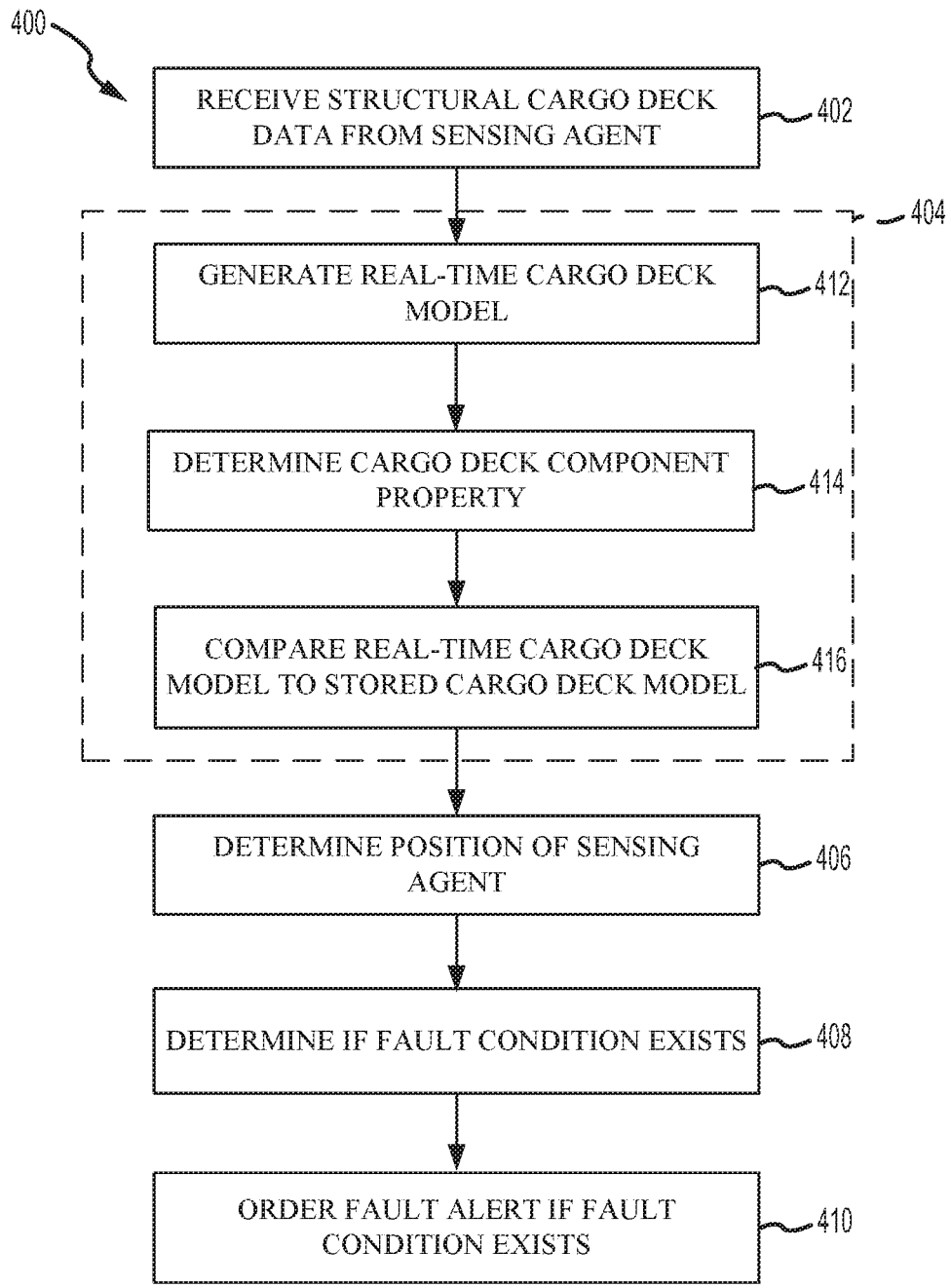

With reference to FIG. 4B and FIG. 2A, in various embodiments, the method 400 may further include determining, by system controller 130, if a calibration fault condition exists (step 408), and ordering, by system controller 130, a fault alert 160 if a calibration fault condition exists (step 410). System controller 130 may determine the calibration fault condition exists if the position of sensing agent, relative to the identified cargo deck component, is outside a predetermined position range. System controller 130 may also determine the calibration fault condition exists if system controller 130 is unable to identify a cargo deck component from the structural data output from the sensing agent. In various embodiments, step 410 may include system controller 130 ordering the fault alert 160 be output by an output device 170.

In various embodiments, step 404 may comprise generating, by system controller 130, a real-time cargo deck model (step 412). System controller 130 may generate the real-time cargo deck model (e.g., real-time cargo deck model 150 in FIG. 3) using the structural cargo deck data output for the sensing agent 110. Step 404 may further include determining, by system controller 130, a cargo deck component property (step 414). The cargo deck component property may be a property of a component in the real-time cargo deck model. Stated differently, system controller 130 may determine the cargo deck component property using the structural cargo deck data output for the sensing agent 110. Step 404 may further include comparing, by system controller 130, the real-time cargo deck model and the cargo deck component property to a stored cargo deck model (step 416). The stored cargo deck model may comprise data corresponding to properties of known cargo deck components. In various embodiments, the stored cargo deck model may be stored and maintained by object database 140.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An autonomous cargo handling system having a sensor self-calibration system, comprising:
    a first sensing agent configured to monitor a first sensing zone;
    a system controller in electronic communication with the first sensing agent; and
    a tangible, non-transitory memory configured to communicate with the system controller, the tangible, non-transitory memory having instructions stored thereon that, in response to execution by the system controller, cause the system controller to perform operations comprising:
        receiving, by the system controller, structural cargo deck data from the first sensing agent;
        generating, by the system controller, a real-time cargo deck model based on the structural cargo deck data;
        identifying, by the system controller, a cargo deck component in the real-time cargo deck model, wherein the cargo deck component is maintained at a constant location on the cargo deck;
        determining, by the system controller, a position of the first sensing agent relative to the cargo deck component based on where the identified cargo deck component appears within the first sensing zone of the first sensing agent; and
        determining, by the system controller, a first area of a cargo deck covered by the first sensing zone based on the position of the first sensing agent relative to the cargo deck component.

2. The autonomous cargo handling system of claim 1, wherein the first sensing agent comprises at least one of a camera, a structured light sensor, a light detection and ranging (LiDAR) sensor, an infrared sensor, a depth sensor, a 3D scanner, an ultrasound range finder, or a radar sensor.

3. The autonomous cargo handling system of claim 1, wherein the cargo deck component comprises at least one of a latch, a rail, or a power drive unit, and wherein the determining, by the system controller, the position of the first sensing agent comprises determining where relative to a boundary of the first sensing zone the cargo deck component is detected.

4. The autonomous cargo handling system of claim 1, wherein the system controller is configured to determine the position of the first sensing agent relative to the cargo deck component and the first area of the cargo deck covered by the first sensing zone each time a new loading event is initiated.

5. The autonomous cargo handling system of claim 1, wherein the system controller is configured to determine the position of the first sensing agent relative to the cargo deck component and the first area of the cargo deck covered by the first sensing zone at a defined time interval throughout a loading event.

6. The autonomous cargo handling system of claim 1, further comprising a second sensing agent configured to monitor a second sensing zone and in communication with the system controller and the first sensing agent, wherein the operations further comprise:
    determining, by the system controller, a position of the second sensing agent relative to the cargo deck component; and
    determining, by the system controller, a position of the first sensing zone relative to the second sensing zone, wherein the first sensing agent is configured to determine a location of a unit load device relative to the first sensing agent based on a signal received from the second sensing agent and using the position of the first sensing agent and the position of the second sensing agent relative to the cargo deck component.

7. The autonomous cargo handling system of claim 1, wherein the identifying the cargo deck component in the real-time cargo deck model comprises comparing, by the system controller, the real-time cargo deck model to a stored cargo deck model.

8. The autonomous cargo handling system of claim 7, wherein the stored cargo deck model is a computer aided design model.

9. A method, comprising:
    receiving, by a system controller, structural cargo deck data from a sensing agent;
    identifying, by the system controller, a cargo deck component;
    determining, by the system controller, a position of the sensing agent relative to the cargo deck component based on where the identified cargo deck component appears within a sensing zone of the sensing agent; and
    determining, by the system controller, an area of a cargo deck covered by the sensing zone based on the position of the sensing agent relative to the cargo deck component.

10. The method of claim 9, wherein identifying the cargo deck component comprises:
    determining, by the system controller, a cargo deck component property based on the structural cargo deck data; and
    comparing, by the system controller, the cargo deck component property to a stored cargo deck model comprising data corresponding to properties of known cargo deck components.

11. The method of claim 9, wherein cargo deck component property comprises at least one of an image of the cargo deck component, a video of the cargo deck component, a dimension of the cargo deck component, a shape of the cargo deck component, a characteristic of the cargo deck component, an orientation of the cargo deck component, a location of the cargo deck component, or point cloud data.

12. The method of claim 9, wherein identifying the cargo deck component comprises:
generating, by the system controller, a real-time cargo deck model using the structural cargo deck data; and
comparing, by the system controller, the real-time cargo deck model to a stored cargo deck model.

13. The method of claim 9, further comprising:
identifying, by the system controller, if a calibration fault condition exists; and
ordering, by the system controller, a fault alert if the calibration fault condition exists.

14. The method of claim 13, wherein the identifying if the calibration fault condition exists comprises comparing the position of the sensing agent relative to the cargo deck component to a predetermined position range.

15. The method of claim 14, wherein the sensing agent comprises at least one of a camera, a structured light sensor, a light detection and ranging (LiDAR) sensor, an infrared sensor, a depth sensor, a 3D scanner, an ultrasound range finder, or a radar sensor.

16. An aircraft, comprising:
a cargo deck defined by an aircraft envelope;
a cargo deck component coupled to at least one of the cargo deck or the aircraft envelope, wherein the cargo deck component remains at a constant location along the cargo deck during a loading event;
a sensing agent coupled to the aircraft envelope, wherein the sensing agent is configured to monitor a sensing zone;
a system controller in electronic communication with the sensing agent; and
a tangible, non-transitory memory configured to communicate with the system controller, the tangible, non-transitory memory having instructions stored thereon that, in response to execution by the system controller, cause the system controller to perform operations comprising:
receiving, by the system controller, structural cargo deck data from the sensing agent;
identifying, by the system controller, a cargo deck component;
determining, by the system controller, a position of the sensing agent relative to the cargo deck component based on where the identified cargo deck component appears within the sensing zone of the sensing agent; and
determining, by the system controller, an area of the cargo deck covered by the sensing zone based on the position of the sensor agent relative to the cargo deck component.

17. The aircraft of claim 16, wherein identifying the cargo deck component comprises:
generating, by the system controller, a real-time cargo deck model using the structural cargo deck data; and
comparing the real-time cargo deck model to a stored cargo deck model.

18. The aircraft of claim 16, wherein identifying the cargo deck component comprises:
determining, by the system controller, a cargo deck component property based on the structural cargo deck data; and
comparing, by the system controller, the cargo deck component property to a stored cargo deck model comprising data corresponding to properties of known cargo deck components.

19. The aircraft of claim 18, wherein the cargo deck component property comprises at least one of an image of the cargo deck component, a video of the cargo deck component, a dimension of the cargo deck component, a shape of the cargo deck component, a characteristic of the cargo deck component, an orientation of the cargo deck component, a location of the cargo deck component, or point cloud data.

20. The aircraft of claim 19, wherein the sensing agent comprises at least one of a camera, a structured light sensor, a light detection and ranging (LiDAR) sensor, an infrared sensor, a depth sensor, a 3D scanner, an ultrasound range finder, a radar sensor.

* * * * *